(12) United States Patent
Kung et al.

(10) Patent No.: US 10,347,996 B2
(45) Date of Patent: Jul. 9, 2019

(54) ELECTRICAL CONNECTOR AND MANUFACTURING METHOD THEREOF

(71) Applicant: LOTES CO., LTD, Keelung (TW)

(72) Inventors: Yung Sheng Kung, Keelung (TW); Lu Xu, Keelung (TW); Jian Wei Gong, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 16/161,452

(22) Filed: Oct. 16, 2018

(65) Prior Publication Data

US 2019/0140365 A1    May 9, 2019

(30) Foreign Application Priority Data

Nov. 7, 2017  (CN) .......................... 2017 1 1122060
Dec. 19, 2017 (CN) .......................... 2017 1 1441584

(51) Int. Cl.
*H01R 4/02* (2006.01)
*H01R 13/03* (2006.01)
(Continued)

(52) U.S. Cl.
CPC ............. *H01R 4/028* (2013.01); *B23K 1/018* (2013.01); *B23K 1/08* (2013.01); *C25D 5/12* (2013.01); *H01R 4/023* (2013.01); *H01R 13/03* (2013.01); *H01R 43/0256* (2013.01); *H01R 13/187* (2013.01)

(58) Field of Classification Search
CPC ....... H01R 13/187; H01R 43/16; H01R 4/028
See application file for complete search history.

(56) References Cited

U.S. PATENT DOCUMENTS 6,042,432 A * 3/2000 Hashizawa .......... H01R 13/187
439/843
6,062,919 A * 5/2000 Trafton ................ H01R 13/187
439/843
(Continued)

FOREIGN PATENT DOCUMENTS

CN    201515062 U    6/2010
CN    104137345 A    11/2014
(Continued)

*Primary Examiner* — Ross N Gushi
(74) *Attorney, Agent, or Firm* — Locke Lord LLP; Tim Tingkang Xia, Esq.

(57) ABSTRACT

An electrical connector includes a barrel type terminal, having a first connecting area and a second connecting area. The first connecting area has a first non-soldering surface and a first soldering surface. The second connecting area has a second non-soldering surface and a second soldering surface. Each of the first and second soldering surfaces and the first and second non-soldering surfaces has a first solder layer. A sleeve sheathes outside the barrel type terminal, and has a first fixing area and a second fixing area. Two second solder layers are provided between the first fixing area and the first soldering surface and between the second fixing area and the second soldering surface. The amount of solder provided between the first fixing area and the first soldering surface and between the second fixing area and the second soldering surface is greater than that provided on the first and second non-soldering surfaces.

27 Claims, 9 Drawing Sheets

(51) Int. Cl.
*B23K 1/08* (2006.01)
*B23K 1/018* (2006.01)
*C25D 5/12* (2006.01)
*H01R 43/02* (2006.01)
*H01R 13/187* (2006.01)

(56) References Cited

U.S. PATENT DOCUMENTS

| | | | | | |
|---|---|---|---|---|---|
| 6,254,439 | B1* | 7/2001 | Endo | | H01R 13/187 439/843 |
| 6,425,786 | B1* | 7/2002 | Scholler | | H01R 13/187 439/843 |
| 6,520,998 | B1* | 2/2003 | Scholler | | H01R 13/187 439/843 |
| 6,656,002 | B2* | 12/2003 | Zhao | | H01R 11/22 439/787 |
| 7,115,003 | B2* | 10/2006 | Zhao | | H01R 11/22 439/851 |
| 7,387,548 | B2* | 6/2008 | Takehara | | H01R 13/187 439/843 |
| 8,142,238 | B2* | 3/2012 | Heigl | | H01R 13/111 439/843 |
| 8,731,671 | B2* | 5/2014 | Rodby | | A61N 1/3752 439/843 |
| 8,784,143 | B2* | 7/2014 | Edgell | | A61N 1/3752 439/246 |
| 9,455,514 | B2* | 9/2016 | Hirakawa | | H01R 13/02 |
| 9,484,641 | B2* | 11/2016 | Ohkubo | | H01R 13/187 |
| 9,490,562 | B2* | 11/2016 | Verity | | H01R 13/111 |
| 9,608,341 | B2* | 3/2017 | Saur | | H01R 4/48 |
| 9,979,111 | B2* | 5/2018 | Yoshioka | | H01R 13/187 |
| 10,050,366 | B2* | 8/2018 | Chevreau | | H01R 13/10 |
| 10,135,167 | B2* | 11/2018 | Wollitzer | | H01R 13/187 |
| 10,193,257 | B1* | 1/2019 | Hirakawa | | H01R 4/184 |
| 10,205,261 | B2* | 2/2019 | Machida | | H01R 4/184 |
| 10,218,103 | B2* | 2/2019 | Ostermann | | H01R 13/04 |
| 2003/0068931 | A1* | 4/2003 | Swearingen | | H01R 4/4881 439/843 |
| 2004/0003498 | A1* | 1/2004 | Swearingen | | H01R 13/187 29/862 |
| 2014/0357137 | A1* | 12/2014 | Sian | | H01R 13/187 439/843 |
| 2015/0244096 | A1* | 8/2015 | Uppleger | | H01R 13/187 439/682 |
| 2016/0226181 | A1* | 8/2016 | Sturgess | | H01R 4/4881 |
| 2016/0254610 | A1* | 9/2016 | Hirakawa | | H01R 13/187 439/816 |
| 2019/0027853 | A1* | 1/2019 | Ungere | | H01R 13/187 |
| 2019/0036260 | A1* | 1/2019 | Szymura | | H01R 13/187 |

FOREIGN PATENT DOCUMENTS

| | | |
|---|---|---|
| CN | 104152962 A | 11/2014 |
| CN | 104178720 A | 12/2014 |
| CN | 105163502 A | 12/2015 |
| CN | 105562863 A | 5/2016 |
| CN | 205428952 U | 8/2016 |
| CN | 106299949 A | 1/2017 |
| CN | 205960215 U | 2/2017 |
| CN | 206098831 U | 4/2017 |
| CN | 104137345 B | 7/2017 |
| CN | 206697634 U | 12/2017 |

\* cited by examiner

A-A

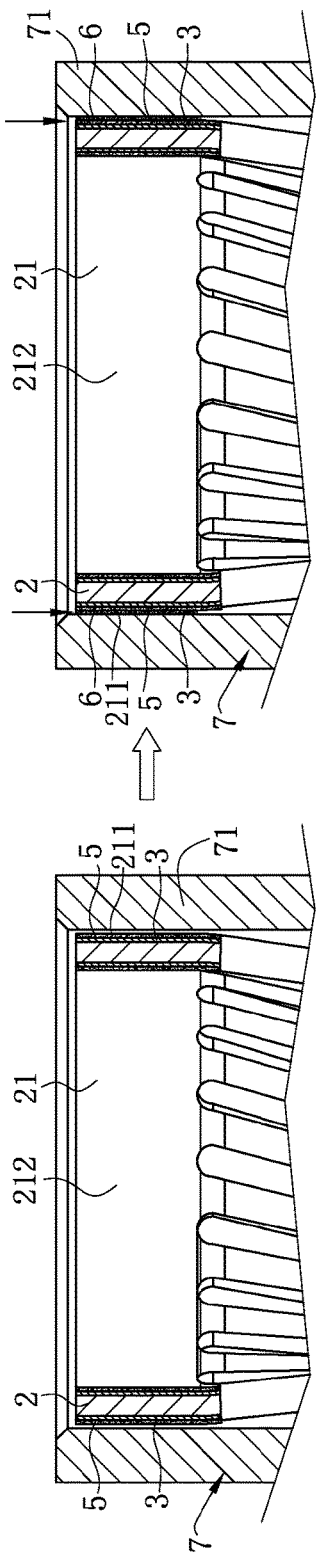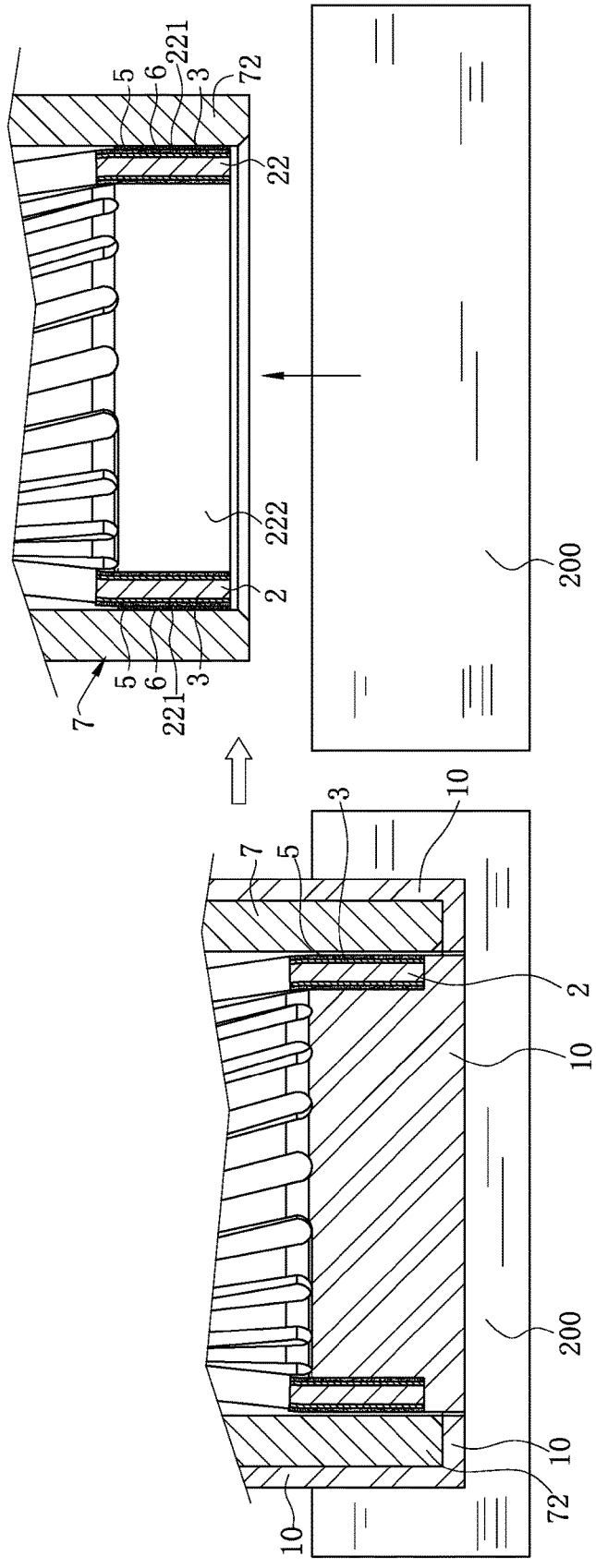

ELECTRICAL CONNECTOR AND MANUFACTURING METHOD THEREOF

CROSS-REFERENCE TO RELATED PATENT APPLICATION

This non-provisional application claims priority to and the benefit of, under 35 U.S.C. § 119(a), patent application Serial No. CN201711122060.0 filed in China on Nov. 7, 2017 and patent application Serial No. CN201711441584.6 filed in China on Dec. 19, 2017. The disclosures of the above applications are incorporated herein in their entireties by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and more particularly to a high-current electrical connector and a manufacturing method thereof.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ordinary conventional high-current electrical connector includes a barrel type terminal and a sleeve. The barrel type terminal has a contact area, a first connecting area and a second connecting area, and the first connecting area and the second connecting area are respectively provided at two ends of the contact area. Each of the first connecting area and the second connecting area is electroplated with a solder layer. Two ends of the sleeve are respectively provided with a first fixing area and a second fixing area. The first fixing area corresponds to the first connecting area, and the second fixing area corresponds to the second connecting area. The sleeve sheathes outside the barrel type terminal, and the sleeve and the barrel type terminal are put together into a reflow oven and heated, such that the first fixing area and the first connecting area are soldered together and the second fixing area and the second connecting area are soldered together. Although this method is simple and quick, in the process of heating, the solder material may easily creep to the contact area, and as a result, the solder amount of the solder layers are reduced, leading to a poor soldering effect, which affects the fixation between the sleeve and the barrel type terminal, and consequently affects the current transmission effect.

Therefore, a heretofore unaddressed need to design an improved electrical connector exists in the art to address the aforementioned deficiencies and inadequacies.

SUMMARY

In view of the above problem in the background technology, the present invention is directed to an electrical connector which increases the amount of solder provided between a first connecting area and a first fixing area and the amount of solder provided between a second connecting area and a second fixing area.

To achieve the foregoing objective, the present invention adopts the following technical solutions:

An electrical connector includes: a barrel type terminal, having a contact area, a first connecting area and a second connecting area, wherein the first connecting area and the second connecting area are respectively provided at two ends of the contact area, an inner surface of the first connecting area has a first non-soldering surface, an outer surface of the first connecting area has a first soldering surface, an inner surface of the second connecting area has a second non-soldering surface, an outer surface of the second connecting area has a second soldering surface, and each of the first soldering surface, the second soldering surface, the first non-soldering surface and the second non-soldering surface has a first solder layer; and a sleeve, sheathing outside the barrel type terminal, wherein two ends of the sleeve are correspondingly provided with a first fixing area and a second fixing area respectively, the first fixing area corresponds to the first connecting area, and the first fixing area and the first soldering surface are heated and soldered; the second fixing area corresponds to the second connecting area, and the second fixing area and the second soldering surface are heated and soldered; two second solder layers are respectively provided between the first fixing area and the first soldering surface and between the second fixing area and the second soldering surface, an amount of solder provided between the first fixing area and the first soldering surface is greater than an amount of solder provided on the first non-soldering surface, and an amount of solder provided between the second fixing area and the second soldering surface is greater than an amount of solder provided on the second non-soldering surface.

In certain embodiments, the heating and soldering between the first fixing area and the first soldering surface and between the second fixing area and the second soldering surface are performed by high-frequency soldering, and during the soldering, a temperature of an outer surface of the first fixing area is greater than a temperature of an inner surface of the first fixing area, and a temperature of an outer surface of the second fixing area is greater than a temperature of an inner surface of the second fixing area.

In certain embodiments, a total thickness of the first solder layer and the second solder layer of the first soldering surface is greater than 2 μm and less than 150 μm, and a total thickness of the first solder layer and the second solder layer of the second soldering surface is greater than 2 μm and less than 150 μm.

In certain embodiments, a height of each of the first connecting area and the second connecting area is greater than 1 mm and less than one fourth of a height of the barrel type terminal.

In certain embodiments, each of the first connecting area, the second connecting area and the contact area has a nickel substrate layer, the contact area is provided with a silver layer covering the nickel substrate layer thereof, and the first connecting area and the second connecting area are provided with the first solder layers covering the nickel substrate layers thereof.

In certain embodiments, the second solder layers are formed by heating and melting a solder material by a high-frequency method and rolling by a rolling member.

In certain embodiments, the solder material is a solder wire.

In certain embodiments, a solder material covers each of the first solder layers and forms the second solder layers along with the first solder layers.

In certain embodiments, each of the first non-soldering surface and the second non-soldering surface is provided with a shielding member, and the first soldering surface and the second soldering surface are immersed in a molten solder, such that the second solder layers are formed on the first soldering surface and the second soldering surface.

In certain embodiments, a solder material is respectively provided between the first fixing area and the first soldering surface and between the second fixing area and the second soldering surface, and is heated by a high-frequency method, such that the second solder layers are respectively formed between the first fixing area and the first soldering surface and between the second fixing area and the second soldering surface.

In certain embodiments, each of an outer surface of the first fixing area, an outer surface of the second fixing area, the first non-soldering surface, and the second non-soldering surface is provided with a shielding member, and the first fixing area, the first soldering surface, the second fixing area and the second soldering surface are immersed in a molten solder, such that the second solder layers are formed between the first fixing area and the first soldering surface and between the second fixing area and the second soldering surface.

A manufacturing method of an electrical connector includes: S1. providing a metal sheet, wherein the metal sheet has a body, and two ends of the body are respectively provided with a first end and a second end; S2. providing a solder material, so as to plate each of the first end and the second end respectively with a first solder layer; S3. forming a barrel type terminal with the metal sheet, wherein the body forms a contact area, the first end forms a first connecting area, and the second end forms a second connecting area, the first connecting area and the second connecting area are respectively located at both ends of the contact area, an inner surface of the first connecting area has a first non-soldering surface, an outer surface of the first connecting area has a first soldering surface, likewise, an inner surface of the second connecting area has a second non-soldering surface, an outer surface of the second connecting area has a second soldering surface, and the first solder layers are located on the first soldering surface and the second soldering surface; and S4. providing a sleeve sheathing outside the barrel type terminal, wherein two ends of the sleeve are correspondingly provided with a first fixing area and a second fixing area respectively, the first fixing area corresponds to the first connecting area, two second solder layers are respectively provided between the first fixing area and the first soldering surface and between the second fixing area and the second soldering surface, an amount of solder provided between the first fixing area and the first soldering surface is greater than an amount of solder provided on the first non-soldering surface, an amount of solder provided between the second fixing area and the second soldering surface is greater than an amount of solder provided on the second non-soldering surface, the first fixing area and the first soldering surface are heated and soldered; the second fixing area corresponds to the second connecting area, and the second fixing area and the second soldering surface are heated and soldered.

In certain embodiments, in the step S1, the metal sheet is plated with nickel, and then the first end and the second end are plated with the first solder layers, and the body is plated with silver.

In certain embodiments, each of the first end and the second end has a first surface and a second surface; after the step S2 and before the step S3, the solder material is heated and melted by a high-frequency method on the first surfaces, and the solder material is rolled by a rolling member to form the second solder layers; and in the step S3, the first surface of the first end is the first soldering surface, the second surface of the first end is the first non-soldering surface, the first surface of the second end is the second soldering surface, and the second surface of the second end is the second non-soldering surface.

In certain embodiments, the solder material is a solder wire.

In certain embodiments, each of the first end and the second end has a first surface and a second surface; after the step S2 and before the step S3, the second surfaces of the first end and the second end are shielded, and the first end and the second end are then immersed in a molten solder, such that the second solder layers are formed on the first surfaces; and in the step S3, the first surface of the first end is the first soldering surface, the second surface of the first end is the first non-soldering surface, the first surface of the second end is the second soldering surface, and the second surface of the second end is the second non-soldering surface.

In certain embodiments, in the step S4, the heating and soldering between the first fixing area and the first soldering surface and between the second fixing area and the second soldering surface are performed by high-frequency soldering, and during the soldering, a temperature of an outer surface of the first fixing area is greater than a temperature of an inner surface of the first fixing area, and a temperature of an outer surface of the second fixing area is greater than a temperature of an inner surface of the second fixing area.

In certain embodiments, in the step S4, the solder material is filled between the first fixing area and the first soldering surface and between the second fixing area and the second soldering surface respectively, and is heated by a high-frequency method, such that the second solder layers are respectively formed between the first fixing area and the first soldering surface and between the second fixing area and the second soldering surface.

In certain embodiments, in the step S4, after an outer surface of the first fixing area, an outer surface of the second fixing area, the first non-soldering surface and the second non-soldering surface are shielded, the first fixing area, the first soldering surface, the second fixing area and the second soldering surface are immersed in a molten solder, such that the second solder layers are formed between the first fixing area and the first soldering surface and between the second fixing area and the second soldering surface.

In certain embodiments, a total thickness of the first solder layer and the second solder layer of the first soldering surface is greater than 2 μm and less than 150 μm, and a total thickness of the first solder layer and the second solder layer of the second soldering surface is greater than 2 μm and less than 150 μm.

In certain embodiments, in the step S4, the solder material covers each of the first solder layers and forms the second solder layers along with the first solder layers.

In certain embodiments, a height of each of the first connecting area and the second connecting area is greater than 1 mm and less than one fourth of a height of the barrel type terminal.

An electrical connector includes: a barrel type terminal, having a contact area and at least one connecting area, wherein an inner surface of the connecting area has a non-soldering surface, an outer surface of the connecting area has a soldering surface, and the soldering surface has a first solder layer; and a sleeve, sheathing outside the barrel type terminal, wherein the sleeve is provided with at least one fixing area, the fixing area corresponds to the connecting area, the fixing area and the soldering surface are soldered by a high-frequency method, a second solder layer is provided between the fixing area and the soldering surface, and an amount of solder provided between the fixing area and the soldering surface is greater than an amount of solder provided on the non-soldering surface.

In certain embodiments, the connecting area has a first connecting area and a second connecting area, the soldering surface comprises a first soldering surface provided on an outer surface of the first connecting area and a second soldering surface provided on an outer surface of the second connecting area, and the first connecting area and the second connecting area are respectively located at two ends of the contact area; correspondingly, the fixing area has a first fixing area and a second fixing area, the first fixing area corresponds to the first connecting area, and the second fixing area corresponds to the second connecting area; and the first fixing area and the first soldering surface are soldered by the high-frequency method, and the second fixing area and the second soldering surface are soldered by the high-frequency method.

In certain embodiments, the non-soldering surface has the first solder layer.

In certain embodiments, an amount of solder provided on the soldering surface is greater than the amount of the solder provided on the non-soldering surface.

In certain embodiments, the second solder layer is provided on the soldering surface, and a total thickness of the first solder layer and the second solder layer provided on the soldering surface is greater than 2 μm and less than 150 μm.

Compared with the related art, the present invention has the following beneficial effects: a first solder layer and a second solder layer are provided between the first fixing area and the first soldering surface, another first solder layer and another second solder layer are provided between the second fixing area and the second soldering surface, and the amount of the solder provided between the second fixing area and the second soldering surface is greater than the amount of the solder provided on the second non-soldering surface. In comparison to the case where only the first solder layers are respectively provided between the first fixing area and the first soldering surface and between the second fixing area and the second soldering surface, the amount of the solder is sufficient with the first solder layers and the second solder layers between the first fixing area and the first soldering surface and between the second fixing area and the second soldering surface, thus ensuring the soldering effect. Moreover, a conduction path between the barrel type terminal and the sleeve is large, that is, the conductive area is large, such that the resistance between the barrel type terminal and the sleeve is low, the amplitude of temperature change in the conducting process between the barrel type terminal and the sleeve is small, the temperature thereof is relatively low, and the heat dissipation effect is good.

The heating and soldering between the first fixing area and the first soldering surface and between the second fixing area and the second soldering surface is performed by high-frequency soldering. During soldering, the temperature of the outer surface of the first fixing area is greater than temperature of the inner surface of the first fixing area, and likewise, the temperature of the outer surface of the second fixing area is greater than the temperature of the inner surface of the second fixing area. In the heating process, the first soldering surface and the second soldering surface are uniformly heated, and the impact of the heat of high-frequency heating on the contact area is little, such that the solder material is only melted on the first soldering surface and the second soldering surface. The temperature of the contact area does not reach the melting point of the solder material, so the solder material does not easily creep to the contact area, such that the amount of the solder between the first fixing area and the first soldering surface and between the second fixing area and the second soldering surface can be large, and the fixing effect between the sleeve and the barrel type terminal is good.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 8 shows a third method for forming the second solder layers of the electrical connector according to certain embodiments of the present invention.

FIG. 9 shows a fourth method for forming the second solder layers of the electrical connector according to certain embodiments of the present invention.

DETAILED DESCRIPTION

Figure 1:
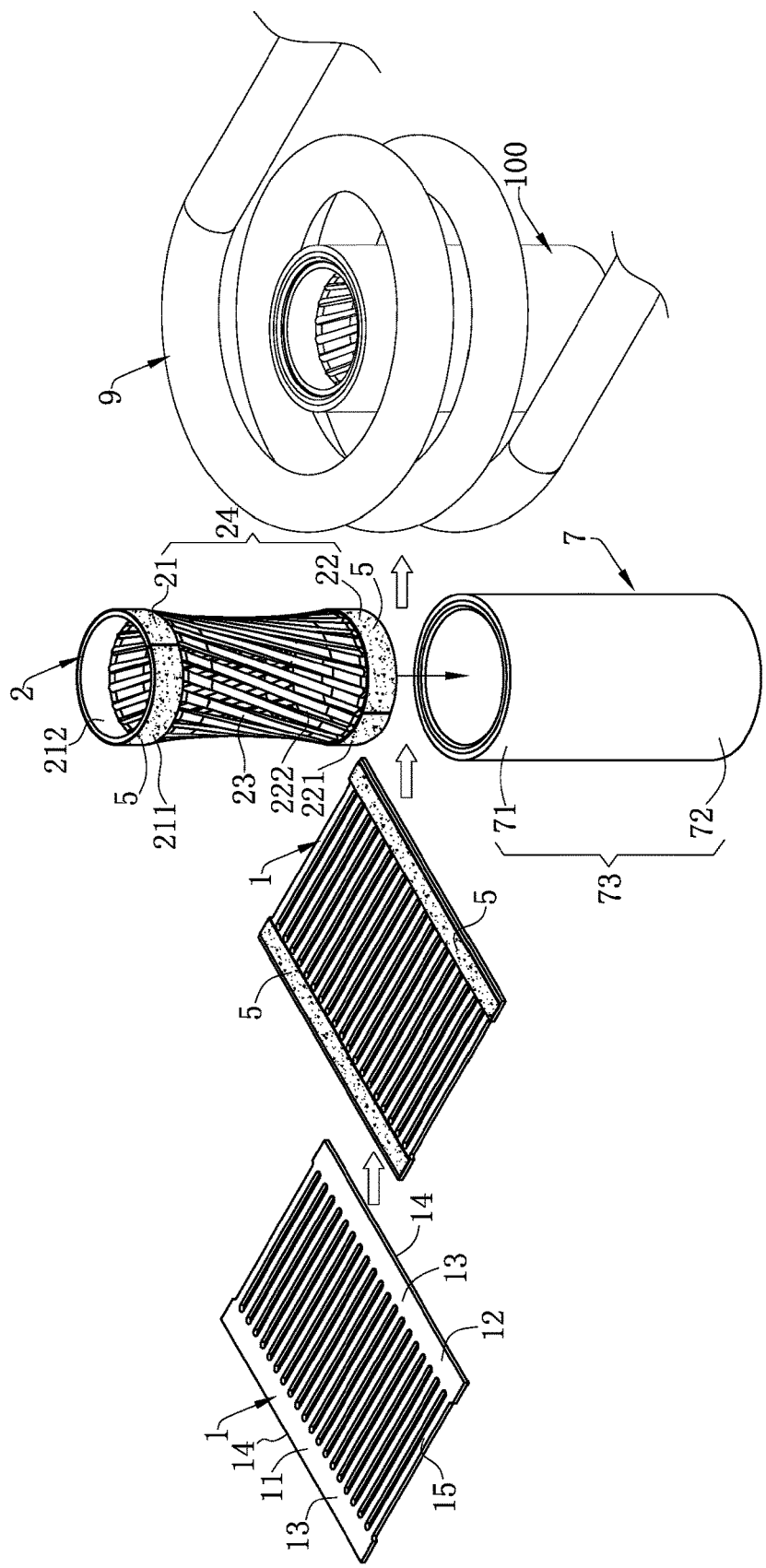
FIG. 1 is a schematic view of a manufacturing process for an electrical connector according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-10. In accordance with the purposes of this invention, as embodied and broadly described herein, this invention, in one aspect, relates to an electrical connector.

Figure 2:
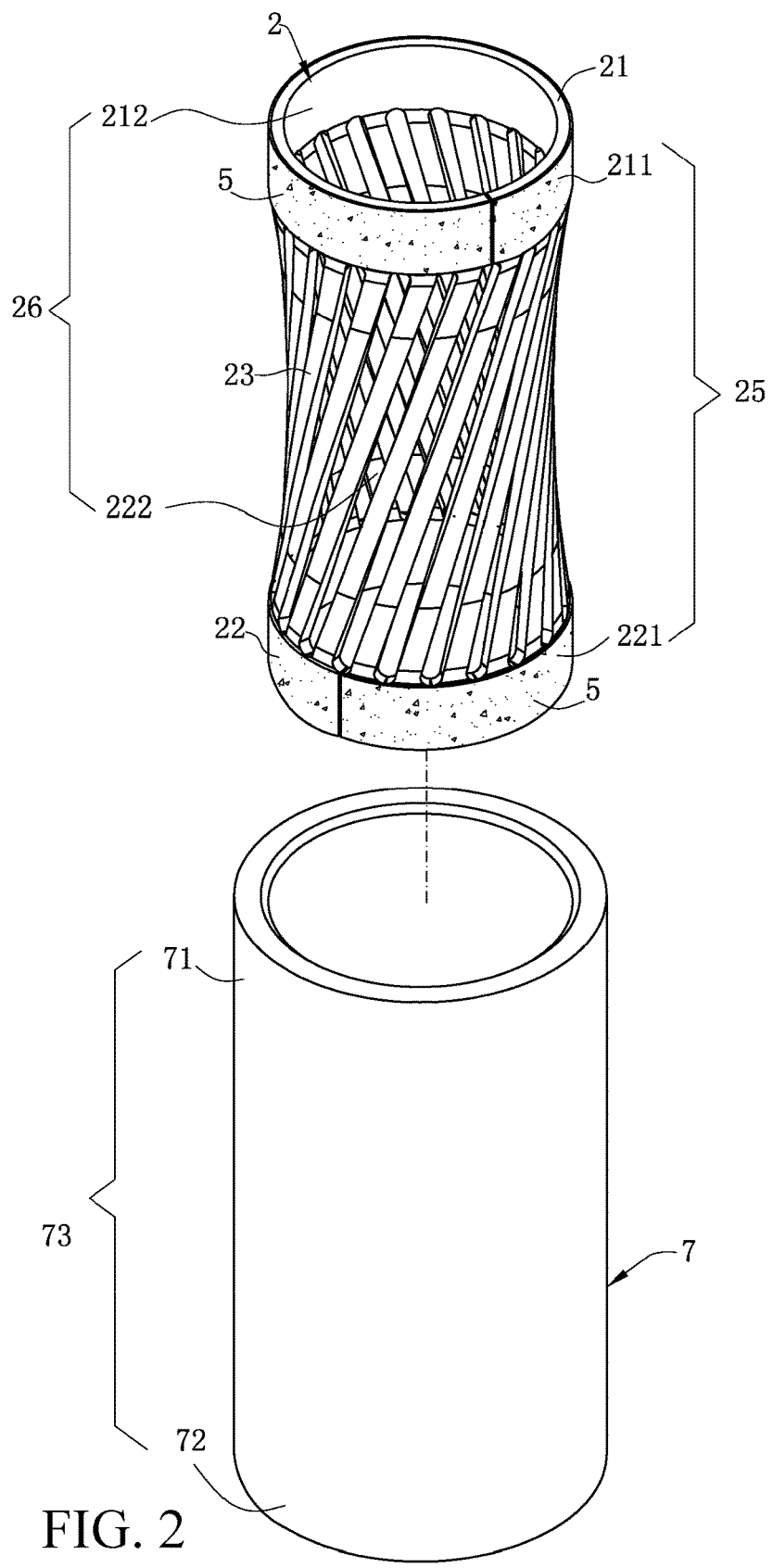
FIG. 2 is a perspective exploded view of an electrical connector according to certain embodiments of the present invention.

As shown in FIG. 2, an electrical connector 100 according to certain embodiments of the present invention includes a barrel type terminal 2 and a sleeve 7.

As shown in FIG. 1 and FIG. 2, the barrel type terminal 2 has a contact area 23 and a connecting area 24, and the connecting area 24 has a soldering surface 25 and a non-soldering surface 26. The connecting area 24 is formed by a first connecting area 21 and a second connecting area 22, and the first connecting area 21 and the second connecting area 22 are respectively provided at two ends of the contact area 23. An inner surface of the first connecting area 21 has a first non-soldering surface 212, and an outer surface of the first connecting area 21 has a first soldering surface 211. Likewise, an inner surface of the second connecting area 22 is provided with a second non-soldering surface 222, and an outer surface of the second connecting area 22 is provided with a second soldering surface 221. The first soldering surface 211 and the second soldering surface 221 form the soldering surface 25, and the first non-soldering surface 212 and the second non-soldering surface 222 form the non-soldering surface 26. In other embodiments, the barrel type terminal 2 can also be only provided with the first connecting area 21 or the second connecting area 22. Each of the first soldering surface 211, the second soldering surface 221, the first non-soldering surface 212 and the second non-soldering surface 222 has a first solder layer 5. In the other embodiments, the first non-soldering surface 212 and the second non-soldering surface 222 can also be provided with no first solder layers 5.

Figure 3:
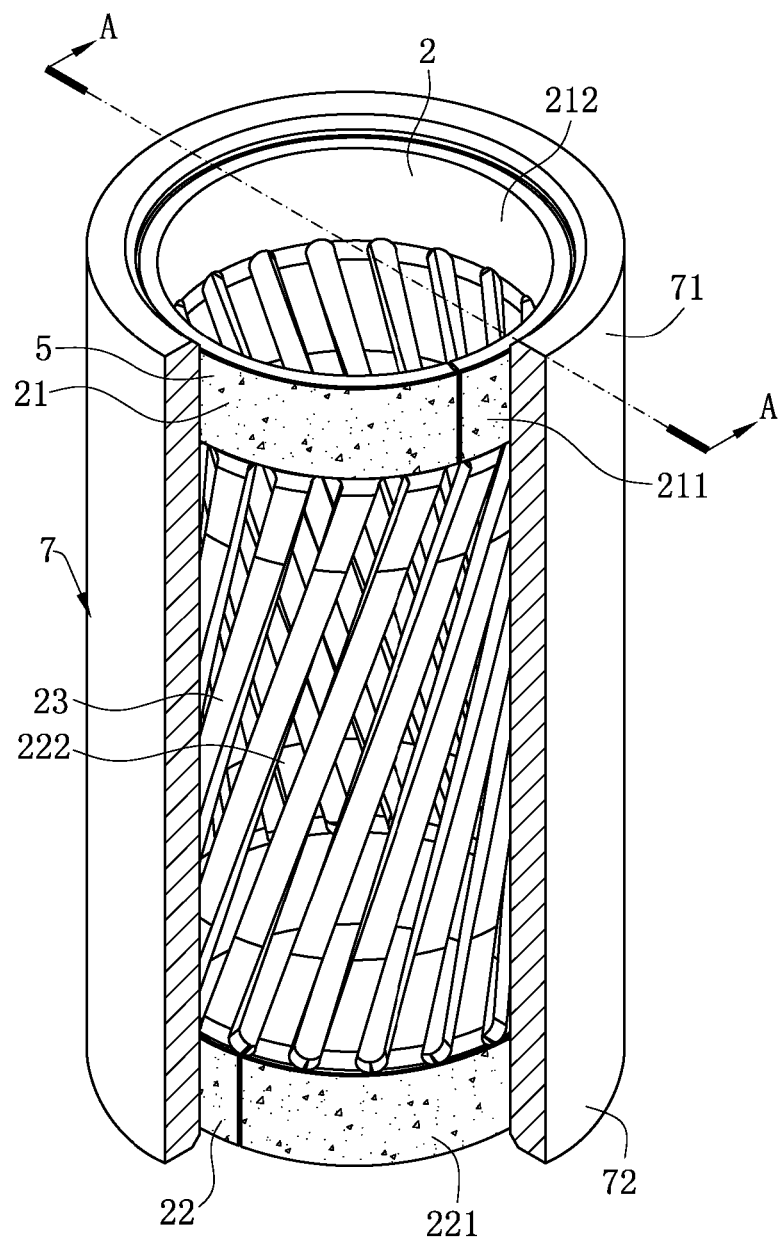
FIG. 3 is a perspective assembly view of an electrical connector according to certain embodiments of the present invention.

As shown in FIG. 1 and FIG. 3, the sleeve 7 sheathes outside the barrel type terminal 2. The sleeve 7 has a fixing area 73. The fixing area 73 has a first fixing area 71 and a second fixing area 72, and the first fixing area 71 and the second fixing area 72 are respectively provided at two ends of the sleeve 7. The fixing area 73 corresponds to the connecting area 24. That is, the first fixing area 71 corresponds to the first connecting area 21, and the first fixing area 71 and the first soldering surface 211 are heated and soldered; and likewise, the second fixing area 72 corresponds to the second connecting area 22, and the second fixing area 72 and the second soldering surface 221 are heated and soldered. In comparison with the case where the barrel type terminal 2 and the sleeve 7 are fixed by a fixing portion (not shown in the drawings), the electrical connector 100 according to certain embodiments of the present invention has fewer components, the manufacturing cost is reduced, and the contact resistance between the barrel type terminal 2 and the sleeve 7 is decreased. In certain embodiments, when the barrel type terminal 2 is only provided with the first connecting area 21 or the second connecting area 22, correspondingly, the fixing area 73 is also only provided with the first fixing area 71 or the second fixing area 72. In the process of heating and soldering by a high-frequency method, the temperature of the outer surface of the first fixing area 71 is greater than the temperature of the inner surface of the first fixing area 71, and likewise, the temperature of the outer surface of the second fixing area 72 is greater than the temperature of the inner surface of the second fixing area 72. The first soldering surface 211 and the second soldering surface 221 are uniformly heated, and the impact of the heat of high-frequency heating on the contact area 23 is little, such that the solder material is only melted on the first soldering surface 211 and the second soldering surface 221. The temperature of the contact area 23 does not reach the melting point of the solder material, so the solder material does not easily creep to the contact area 23. Consequently, the amount of solder between the first fixing area 71 and the first soldering surface 211 and between the second fixing area 72 and the second soldering surface 221 is large, and the fixing effect between the sleeve 7 and the barrel type terminal 2 is good. Because the height of each of the first connecting area 21 and the second connecting area 22 is greater than 1 mm and less than one fourth of the height of the barrel type terminal 2, it is ensured that the soldering area between the first fixing area 71 and the first soldering surface 211 and the soldering area between the second fixing area 72 and the second soldering surface 221 are large enough and that soldering is firmer. Moreover, in comparison with the case where the barrel type terminal 2 only has the first soldering surface 211, the contact resistance between the barrel type terminal 2 having both the first soldering surface 211 and the second soldering surface 221 and the sleeve 7 is effectively decreased, and therefore the reliability of contact is increased.

Figure 4:
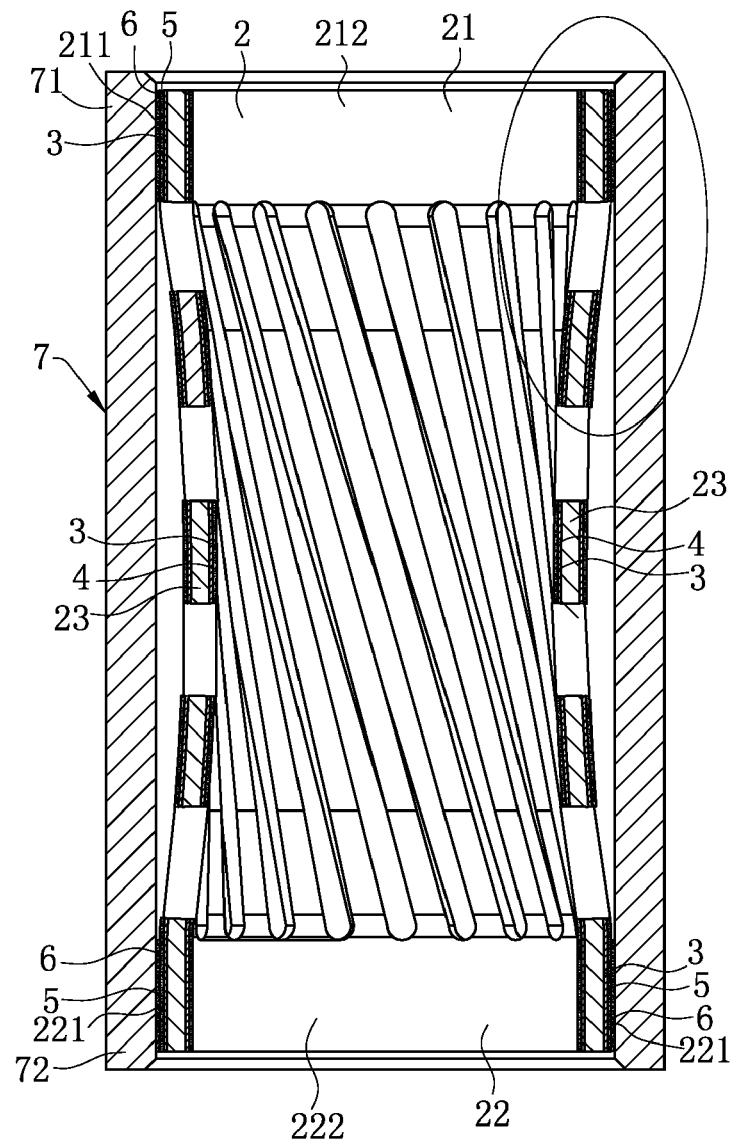
FIG. 4 is a sectional view of FIG. 3 along the A-A direction.
Figure 5:
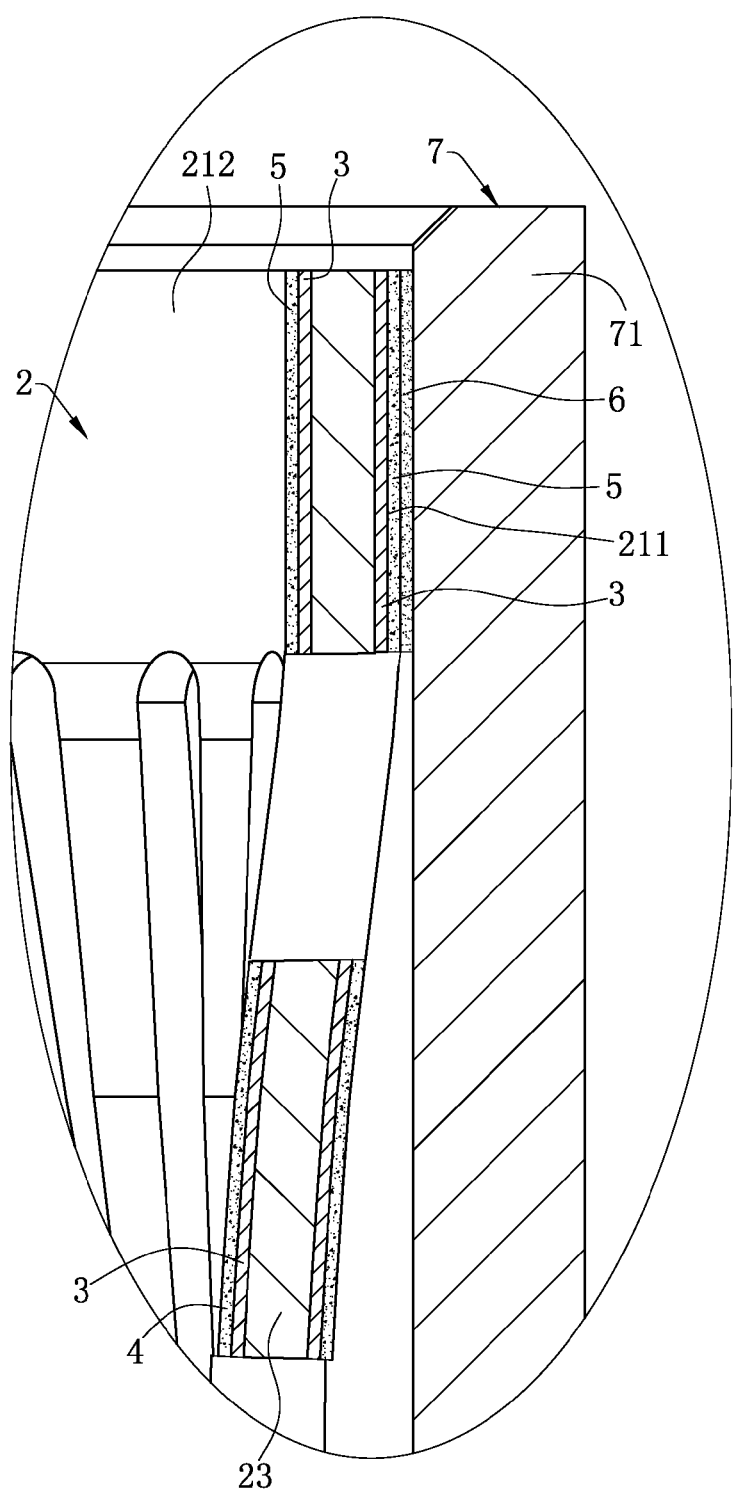
FIG. 5 is a partially enlarged view of FIG. 4.

As shown in FIG. 4 and FIG. 5, two second solder layers 6 are respectively provided between the first fixing area 71 and the first soldering surface 211 and between the second fixing area 72 and the second soldering surface 221. That is, a first solder layer 5 and a second solder layer 6 are provided between the first fixing area 71 and the first soldering surface 211, and another first solder layer 5 and another second solder layer 6 are provided between the second fixing area 72 and the second soldering surface 221. Therefore, the amount of solder provided between the first fixing area 71 and the first soldering surface 211 is greater than the amount of solder provided on the first non-soldering surface 212, and the amount of solder provided between the second fixing area 72 and the second soldering surface 221 is greater than the amount of solder provided on the second non-soldering surface 222. In other words, the amount of the solder provided on the first soldering surface 211 is greater than the amount of the solder of the first non-soldering surface 212, and the amount of the solder provided on the second soldering surface 221 is greater than the amount of the solder of the second non-soldering surface 222. Further, a total thickness of the first solder layer 5 and the second solder layer 6 of the first soldering surface 211 is greater than 2 μm and less than 150 μm, and a total thickness of the first solder layer 5 and the second solder layer 6 of the second soldering surface 221 is greater than 2 μm and less than 150 μm. In comparison with the case where only the first solder layers 5 are respectively provided between the first fixing area 71 and the first soldering surface 211 and between the second fixing area 72 and the second soldering surface 221, the amount of the solder is sufficient with the first solder layers 5 and the second solder layers 6 between the first fixing area 71 and the first soldering surface 211 and between the second fixing area 72 and the second soldering surface 221, thus ensuring the soldering effect. Moreover, a conduction path between the barrel type terminal 2 and the sleeve 7 is large. That is, the conductive area is large, such that the resistance between the barrel type terminal 2 and the sleeve 7 is low, the amplitude of temperature change in the conducting process between the barrel type terminal 2 and the sleeve 7 is small, the temperature thereof is relatively low, and the heat dissipation effect is good.

Figure 10:
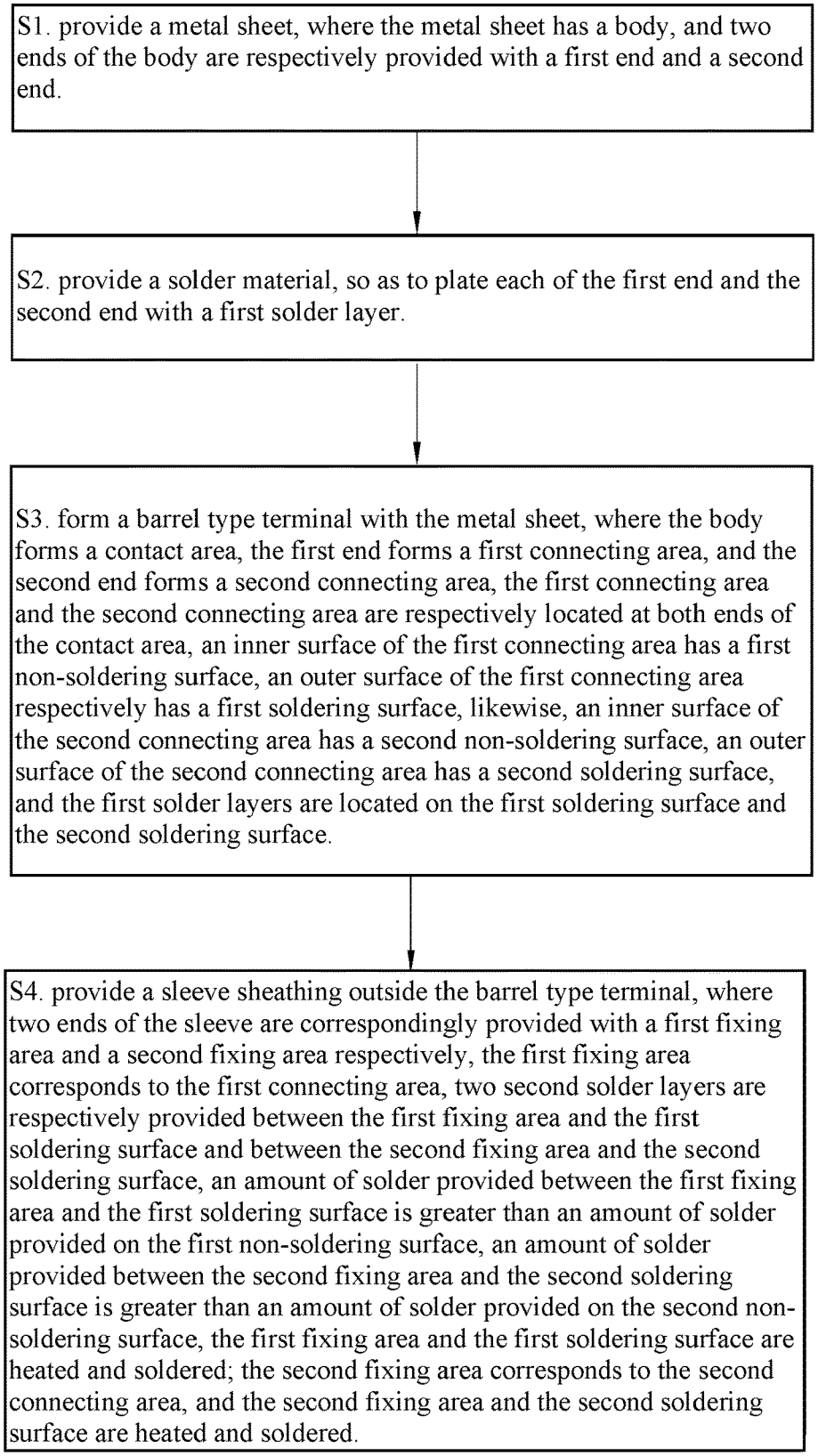
FIG. 10 is a flowchart of a manufacturing method of an electrical connector according to certain embodiments of the present invention.

As shown in FIG. 1, FIG. 5 and FIG. 10, a manufacturing method of the electrical connector 100 includes steps S1, S2, S3 and S4. In step S1, a metal sheet 1 is provided, where the metal sheet 1 has a body 15, two ends of the body 15 are respectively provided with a first end 11 and a second end 12, and each of the first end 11 and the second end 12 has a first surface 13 and a second surface 14. The metal sheet 1 is plated with nickel, such that each of the first connecting area 21, the second connecting area 22 and the contact area 23 has a nickel substrate layer 3. In step S2, a solder material is provided, so as to plate the first end 11 and the second end 12 with the first solder layers 5. The first solder layers 5 cover the nickel substrate layers 3, the body 15 is plated with a silver layer 4, and the silver layer 4 covers the nickel substrate layers 3. In step S3, the barrel type terminal 2 is formed with the metal sheet 1, where the body 15 forms the contact area 23, the first end 11 forms the first connecting area 21, and the second end 12 forms the second connecting area 22. The first surface 13 of the first end 11 is the first soldering surface 211, and the second surface 14 of the first end 11 is the first non-soldering surface 212. The first surface 13 of the second end 12 is the second soldering surface 221, and the second surface 14 of the second end 12 is the second non-soldering surface 222. In step S4, the sleeve 7 is provided, and the sleeve 7 sheathes outside the barrel type terminal 2. The second solder layers 6 are located between the first fixing area 71 and the first soldering surface 211 and between the second fixing area 72 and the second soldering surface 221. The solder material covers the first solder layers 5 and forms the second solder layers 6 along with the first solder layers 5. Of course, each of the first solder layer 5 and the second solder layer 6 can be one layer. The first fixing area 71 and the first soldering surface 211, as well as the second fixing area 72 and the second soldering surface 221, are soldered by the high-frequency method.

Figure 6:
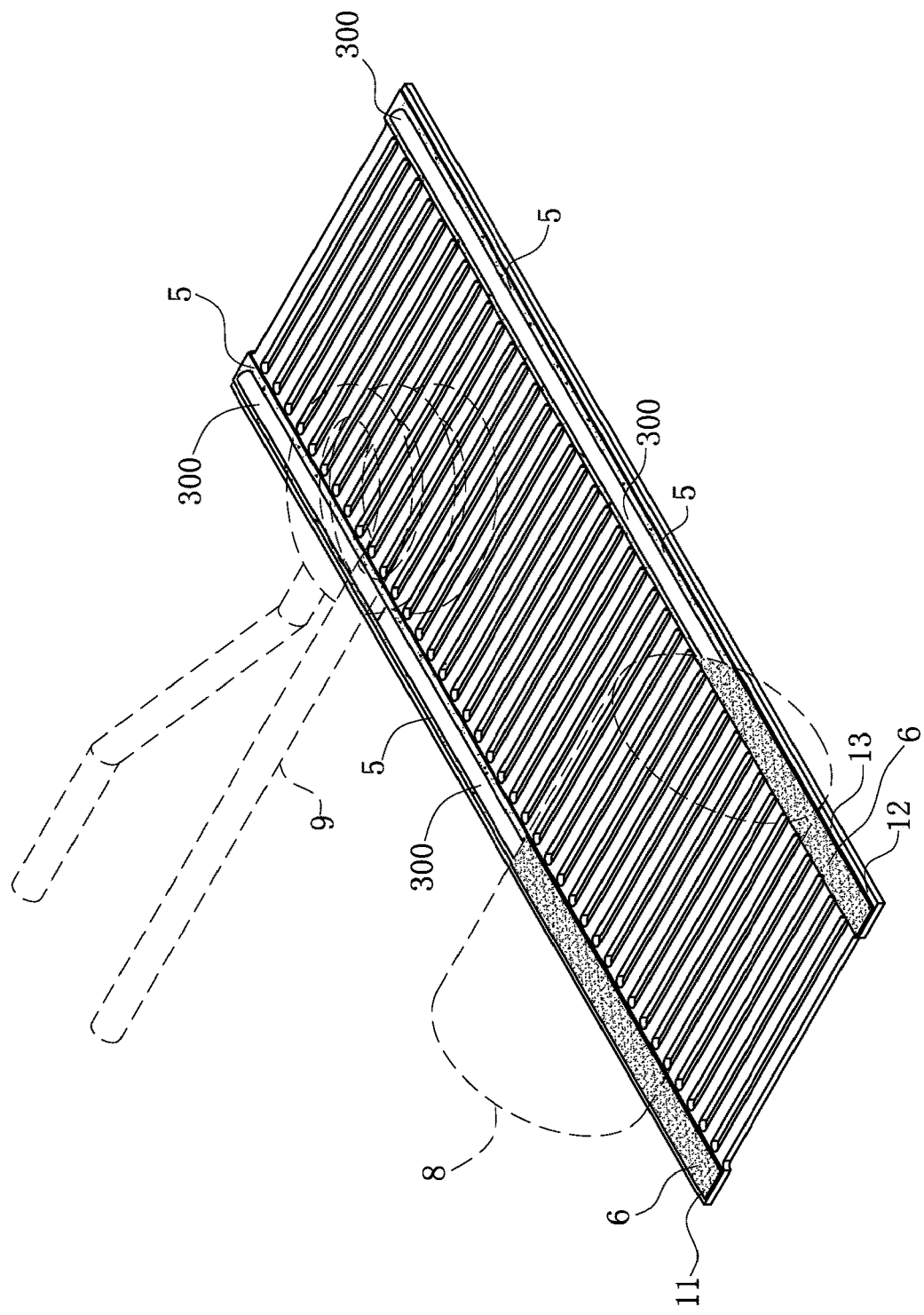
FIG. 6 shows a first method for forming a second solder layer of the electrical connector according to certain embodiments of the present invention.

Referring to FIG. 1, FIG. 5 and FIG. 6, which show a first method for forming the second solder layer 6. After step S2 and before step S3, a solder wire 300 is held by a clamp (not shown in the drawings) or manually. One end of the solder wire 300 abuts the first surface 13, and is heated by a high-frequency heating element 9. As the solder wire 300 is dragged along the first surface 13, the molten solder can be stuck on the first surface 13. A rolling member 8 is provided on the metal sheet 1 and rolls in the moving direction of the solder wire 300, such that the solder melted on the first surfaces 13 is evenly pressed to form the second solder layer 6.

Figure 7:
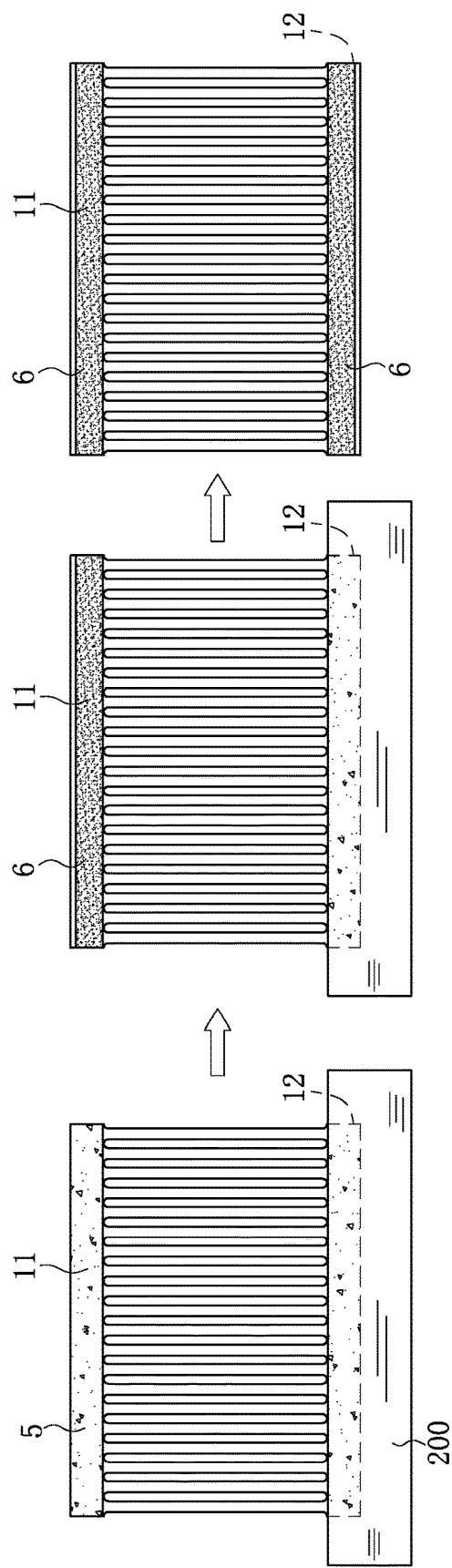
FIG. 7 shows a second method for forming the second solder layer of the electrical connector according to certain embodiments of the present invention.

Referring to FIG. 1, FIG. 5 and FIG. 7, which show a second method for forming the second solder layer 6. After step S2 and before step S3, the first end 11 and the second end 12 are each provided with a shielding member 10 to shield the second surface 14, and the first end 11 and the second end 12 are then immersed in molten solder 200, such that the second solder layers 6 are formed on the first surfaces 13.

Referring to FIG. 1, FIG. 5 and FIG. 8, which show a third method for forming the second solder layers 6. In step S4, the sleeve 7 sheathes outside the barrel type terminal 2. The solder material is respectively filled between the first fixing area 71 and the first soldering surface 211 and between the second fixing area 72 and the second soldering surface 221, and is heated by the high-frequency method, such that the second solder layers 6 are respectively formed between the first fixing area 71 and the first soldering surface 211 and between the second fixing area 72 and the second soldering surface 221.

Referring to FIG. 1, FIG. 5 and FIG. 9, which show a fourth method for forming the second solder layers 6. In step S4, each of an outer surface of the first fixing area 71, an outer surface of the second fixing area 72, the first non-soldering surface 212 and the second non-soldering surface 222 is provided with a shielding member 10, such that the outer surfaces of the first fixing area 71 and the second fixing area 72, the first non-soldering surface 212 and the second non-soldering surface 222 are shielded. The first fixing area 71, the first soldering surface 211, the second fixing area 72 and the second soldering surface 221 are immersed in the molten solder 200, such that the second solder layers 6 are formed between the first fixing area 71 and the first soldering surface 211 and between the second fixing area 72 and the second soldering surface 221.

To sum up, the electrical connector 100 and the manufacturing method of the electrical connector 100 according to certain embodiments of the present invention have the following beneficial effects:

(1) The sleeve 7 sheathes outside the barrel type terminal 2, and two ends of the sleeve 7 are correspondingly provided with the first fixing area 71 and the second fixing area 72 respectively. The first fixing area 71 corresponds to the first connecting area 21, and the first fixing area 71 and the first soldering surface 211 are heated and soldered. Likewise, the second fixing area 72 corresponds to the second connecting area 22, and the second fixing area 72 and the second soldering surface 221 are heated and soldered. In comparison with the case where the barrel type terminal 2 and the sleeve 7 are fixed by a fixing portion (not shown in the drawings), the electrical connector 100 according to certain embodiments of the present invention has fewer components, the manufacturing cost is reduced, and the contact resistance between the barrel type terminal 2 and the sleeve 7 is decreased.

(2) In the process of heating and soldering by a high-frequency method, the temperature of the outer surface of the first fixing area 71 is greater than the temperature of the inner surface of the first fixing area 71, and likewise, the temperature of the outer surface of the second fixing area 72 is greater than the temperature of the inner surface of the second fixing area 72. The first soldering surface 211 and the second soldering surface 221 are uniformly heated, and the impact of the heat of high-frequency heating on the contact area 23 is little, such that the solder material is only melted on the first soldering surface 211 and the second soldering surface 221. The temperature of the contact area 23 does not reach the melting point of the solder material, so the solder material does not easily creep to the contact area 23. Consequently, the amount of solder between the first fixing area 71 and the first soldering surface 211 and between the second fixing area 72 and the second soldering surface 221 is large, and the fixing effect between the sleeve 7 and the barrel type terminal 2 is good.

(3) Because the height of each of the first connecting area 21 and the second connecting area 22 is greater than 1 mm and less than one fourth of the height of the barrel type terminal 2, it is ensured that the soldering area between the first fixing area 71 and the first soldering surface 211 and the soldering area between the second fixing area 72 and the second soldering area 221 are large enough and that soldering is firmer. Moreover, in comparison with the case where the barrel type terminal 2 only has the first soldering surface 211, the contact resistance between the barrel type terminal 2 having both the first soldering surface 211 and the second soldering surface 221 and the sleeve 7 is effectively decreased, and therefore the reliability of contact is increased.

(4) The two second solder layers 6 are respectively provided between the first fixing area 71 and the first soldering surface 211 and between the second fixing area 72 and the second soldering surface 221. That is, a first solder layer 5 and a second solder layer 6 are provided between the first fixing area 71 and the first soldering surface 211, and another first solder layer 5 and another second solder layer 6 are provided between the second fixing area 72 and the second soldering surface 221. Therefore, the amount of solder provided between the first fixing area 71 and the first soldering surface 211 is greater than the amount of solder provided on the first non-soldering surface 212, and the amount of solder provided between the second fixing area 72 and the second soldering surface 221 is greater than the amount of solder provided on the second non-soldering surface 222. Further, a total thickness of the first solder layer 5 and the second solder layer 6 of the first soldering surface 211 is greater than 2 μm and less than 150 μm, and a total thickness of the first solder layer 5 and the second solder layer 6 of the second soldering surface 221 is greater than 2 μm and less than 150 μm. In comparison with the case where only the first solder layers 5 are respectively provided between the first fixing area 71 and the first soldering surface 211 and between the second fixing area 72 and the second soldering surface 221, the amount of the solder is sufficient with the first solder layers 5 and the second solder layers 6 between the first fixing area 71 and the first soldering surface 211 and between the second fixing area 72 and the second soldering surface 221, thus ensuring the soldering effect. Moreover, a conduction path between the barrel type terminal 2 and the sleeve 7 is large. That is, the conductive area is large, such that the resistance between the barrel type terminal 2 and the sleeve 7 is low, the amplitude of temperature change in the conducting process between the barrel type terminal 2 and the sleeve 7 is small, the temperature thereof is relatively low, and the heat dissipation effect is good.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, comprising:
   a barrel type terminal, having a contact area, a first connecting area and a second connecting area, wherein the first connecting area and the second connecting area are respectively provided at two ends of the contact area, an inner surface of the first connecting area has a first non-soldering surface, an outer surface of the first connecting area has a first soldering surface, an inner surface of the second connecting area has a second non-soldering surface, an outer surface of the second connecting area has a second soldering surface, and each of the first soldering surface, the second soldering surface, the first non-soldering surface and the second non-soldering surface has a first solder layer; and
   a sleeve, sheathing outside the barrel type terminal, wherein two ends of the sleeve are correspondingly provided with a first fixing area and a second fixing area respectively, the first fixing area corresponds to the first connecting area, and the first fixing area and the first soldering surface are heated and soldered; the second fixing area corresponds to the second connecting area, and the second fixing area and the second soldering surface are heated and soldered; two second solder layers are respectively provided between the first fixing area and the first soldering surface and between the second fixing area and the second soldering surface, an amount of solder provided between the first fixing area and the first soldering surface is greater than an amount of solder provided on the first non-soldering surface, and an amount of solder provided between the second fixing area and the second soldering surface is greater than an amount of solder provided on the second non-soldering surface.

2. The electrical connector according to claim 1, wherein the heating and soldering between the first fixing area and the first soldering surface and between the second fixing area and the second soldering surface are performed by high-frequency soldering, and during the soldering, a temperature of an outer surface of the first fixing area is greater than a temperature of an inner surface of the first fixing area, and a temperature of an outer surface of the second fixing area is greater than a temperature of an inner surface of the second fixing area.

3. The electrical connector according to claim 1, wherein a total thickness of the first solder layer and the second solder layer of the first soldering surface is greater than 2 μm and less than 150 μm, and a total thickness of the first solder layer and the second solder layer of the second soldering surface is greater than 2 μm and less than 150 μm.

4. The electrical connector according to claim 1, wherein a height of each of the first connecting area and the second connecting area is greater than 1 mm and less than one fourth of a height of the barrel type terminal.

5. The electrical connector according to claim 1, wherein each of the first connecting area, the second connecting area and the contact area has a nickel substrate layer, the contact area is provided with a silver layer covering the nickel substrate layer thereof, and the first connecting area and the second connecting area are provided with the first solder layers covering the nickel substrate layers thereof.

6. The electrical connector according to claim 1, wherein the second solder layers are formed by heating and melting a solder material by a high-frequency method and rolling by a rolling member.

7. The electrical connector according to claim 6, wherein the solder material is a solder wire.

8. The electrical connector according to claim 1, wherein a solder material covers each of the first solder layers and forms the second solder layers along with the first solder layers.

9. The electrical connector according to claim 1, wherein each of the first non-soldering surface and the second non-soldering surface is provided with a shielding member, and the first soldering surface and the second soldering surface are immersed in a molten solder, such that the second solder layers are formed on the first soldering surface and the second soldering surface.

10. The electrical connector according to claim 1, wherein a solder material is respectively provided between the first fixing area and the first soldering surface and between the second fixing area and the second soldering surface, and is heated by a high-frequency method, such that the second solder layers are respectively formed between the first fixing area and the first soldering surface and between the second fixing area and the second soldering surface.

11. The electrical connector according to claim 1, wherein each of an outer surface of the first fixing area, an outer surface of the second fixing area, the first non-soldering surface, and the second non-soldering surface is provided with a shielding member, and the first fixing area, the first soldering surface, the second fixing area and the second soldering surface are immersed in a molten solder, such that the second solder layers are formed between the first fixing area and the first soldering surface and between the second fixing area and the second soldering surface.

12. A manufacturing method of an electrical connector, comprising:
S1. providing a metal sheet, wherein the metal sheet has a body, and two ends of the body are respectively provided with a first end and a second end;
S2. providing a solder material, so as to plate each of the first end and the second end respectively with a first solder layer;
S3. forming a barrel type terminal with the metal sheet, wherein the body forms a contact area, the first end forms a first connecting area, and the second end forms a second connecting area, the first connecting area and the second connecting area are respectively located at both ends of the contact area, an inner surface of the first connecting area has a first non-soldering surface, an outer surface of the first connecting area has a first soldering surface, likewise, an inner surface of the second connecting area has a second non-soldering surface, an outer surface of the second connecting area has a second soldering surface, and the first solder layers are located on the first soldering surface and the second soldering surface; and
S4. providing a sleeve sheathing outside the barrel type terminal, wherein two ends of the sleeve are correspondingly provided with a first fixing area and a second fixing area respectively, the first fixing area corresponds to the first connecting area, two second solder layers are respectively provided between the first fixing area and the first soldering surface and between the second fixing area and the second soldering surface, an amount of solder provided between the first fixing area and the first soldering surface is greater than an amount of solder provided on the first non-soldering surface, an amount of solder provided between the second fixing area and the second soldering surface is greater than an amount of solder provided on the second non-soldering surface, the first fixing area and the first soldering surface are heated and soldered; the second fixing area corresponds to the second connecting area, and the second fixing area and the second soldering surface are heated and soldered.

13. The manufacturing method of the electrical connector according to claim 12, wherein in the step S1, the metal sheet is plated with nickel, and then the first end and the second end are plated with the first solder layers, and the body is plated with silver.

14. The manufacturing method of the electrical connector according to claim 12, wherein:
each of the first end and the second end has a first surface and a second surface;
after the step S2 and before the step S3, the solder material is heated and melted by a high-frequency method on the first surfaces, and the solder material is rolled by a rolling member to form the second solder layers; and
in the step S3, the first surface of the first end is the first soldering surface, the second surface of the first end is the first non-soldering surface, the first surface of the second end is the second soldering surface, and the second surface of the second end is the second non-soldering surface.

15. The manufacturing method of the electrical connector according to claim 14, wherein the solder material is a solder wire.

16. The manufacturing method of the electrical connector according to claim 12, wherein:
each of the first end and the second end has a first surface and a second surface;
after the step S2 and before the step S3, the second surfaces of the first end and the second end are shielded, and the first end and the second end are then immersed in a molten solder, such that the second solder layers are formed on the first surfaces; and
in the step S3, the first surface of the first end is the first soldering surface, the second surface of the first end is the first non-soldering surface, the first surface of the second end is the second soldering surface, and the second surface of the second end is the second non-soldering surface.

17. The manufacturing method of the electrical connector according to claim 12, wherein in the step S4, the heating and soldering between the first fixing area and the first soldering surface and between the second fixing area and the second soldering surface are performed by high-frequency soldering, and during the soldering, a temperature of an outer surface of the first fixing area is greater than a temperature of an inner surface of the first fixing area, and a temperature of an outer surface of the second fixing area is greater than a temperature of an inner surface of the second fixing area.

18. The manufacturing method of the electrical connector according to claim 12, wherein in the step S4, the solder material is filled between the first fixing area and the first soldering surface and between the second fixing area and the second soldering surface respectively, and is heated by a high-frequency method, such that the second solder layers are respectively formed between the first fixing area and the first soldering surface and between the second fixing area and the second soldering surface.

19. The manufacturing method of the electrical connector according to claim 12, wherein in the step S4, after an outer surface of the first fixing area, an outer surface of the second fixing area, the first non-soldering surface and the second non-soldering surface are shielded, the first fixing area, the first soldering surface, the second fixing area and the second soldering surface are immersed in a molten solder, such that the second solder layers are formed between the first fixing area and the first soldering surface and between the second fixing area and the second soldering surface.

20. The manufacturing method of the electrical connector according to claim 12, wherein a total thickness of the first solder layer and the second solder layer of the first soldering surface is greater than 2 μm and less than 150 μm, and a total thickness of the first solder layer and the second solder layer of the second soldering surface is greater than 2 μm and less than 150 μm.

21. The manufacturing method of the electrical connector according to claim 12, wherein in the step S4, the solder material covers each of the first solder layers and forms the second solder layers along with the first solder layers.

22. The manufacturing method of the electrical connector according to claim 12, wherein a height of each of the first connecting area and the second connecting area is greater than 1 mm and less than one fourth of a height of the barrel type terminal.

23. An electrical connector, comprising:
a barrel type terminal, having a contact area and at least one connecting area, wherein an inner surface of the connecting area has a non-soldering surface, an outer surface of the connecting area has a soldering surface, and the soldering surface has a first solder layer; and
a sleeve, sheathing outside the barrel type terminal, wherein the sleeve is provided with at least one fixing area, the fixing area corresponds to the connecting area, the fixing area and the soldering surface are soldered by a high-frequency method, a second solder layer is provided between the fixing area and the soldering surface, and an amount of solder provided between the fixing area and the soldering surface is greater than an amount of solder provided on the non-soldering surface.

24. The electrical connector according to claim 23, wherein:
the connecting area has a first connecting area and a second connecting area, the soldering surface comprises a first soldering surface provided on an outer surface of the first connecting area and a second soldering surface provided on an outer surface of the second connecting area, and the first connecting area and the second connecting area are respectively located at two ends of the contact area;
correspondingly, the fixing area has a first fixing area and a second fixing area, the first fixing area corresponds to the first connecting area, and the second fixing area corresponds to the second connecting area; and
the first fixing area and the first soldering surface are soldered by the high-frequency method, and the second fixing area and the second soldering surface are soldered by the high-frequency method.

25. The electrical connector according to claim 23, wherein the non-soldering surface has the first solder layer.

26. The electrical connector according to claim 25, wherein an amount of solder provided on the soldering surface is greater than the amount of the solder provided on the non-soldering surface.

27. The electrical connector according to claim 25, wherein the second solder layer is provided on the soldering surface, and a total thickness of the first solder layer and the second solder layer provided on the soldering surface is greater than 2 μm and less than 150 μm.

* * * * *